(12) United States Patent
Singh et al.

(10) Patent No.: US 9,446,561 B2
(45) Date of Patent: Sep. 20, 2016

(54) TIRE CURING PRESS

(71) Applicant: McNeil & NRM, Inc., Akron, OH (US)

(72) Inventors: Anand Pal Singh, Akron, OH (US);
Miles Stafford Roberts, Clinton, OH (US)

(73) Assignee: MCNEIL & NRM, INC., Akron, OH (US)

( * ) Notice: Subject to any disclaimer, the term of this patent is extended or adjusted under 35 U.S.C. 154(b) by 432 days.

(21) Appl. No.: 14/028,800

(22) Filed: Sep. 17, 2013

(65) Prior Publication Data

US 2015/0079210 A1 Mar. 19, 2015

(51) Int. Cl.
| | | |
|---|---|---|
| *B29D 30/06* | (2006.01) | |
| *B29K 105/24* | (2006.01) | |
| *B29K 105/00* | (2006.01) | |
| *B29C 33/20* | (2006.01) | |

(52) U.S. Cl.
CPC ....... *B29D 30/0601* (2013.01); *B29D 30/0605* (2013.01); *B29D 30/0662* (2013.01); *B29C 33/202* (2013.01); *B29K 2105/246* (2013.01); *B29K 2105/253* (2013.01)

(58) Field of Classification Search
CPC .......... B29D 30/0601; B29D 30/0605; B29D 30/0606; B29D 30/0662; B29C 33/202
See application file for complete search history.

(56) References Cited

U.S. PATENT DOCUMENTS

| | | | |
|---|---|---|---|
| 627,230 A | 6/1899 | Hardy | |
| 1,698,846 A | 1/1929 | Hutchens | |
| 3,590,433 A | 7/1971 | Rawls | |
| 4,332,536 A * | 6/1982 | Singh | B29D 30/0649 425/33 |
| 4,383,808 A | 5/1983 | Kubo et al. | |
| 4,563,139 A | 1/1986 | Yokoyama et al. | |
| 4,647,273 A | 3/1987 | Singh et al. | |
| 4,669,964 A * | 6/1987 | Amano | B30B 15/00 425/34.1 |
| 4,698,002 A | 10/1987 | Grotkasten | |
| 4,804,318 A | 2/1989 | Fujieda et al. | |

(Continued)

FOREIGN PATENT DOCUMENTS

| | | |
|---|---|---|
| EP | 2857184 A2 | 4/2015 |
| EP | 2857184 A3 | 9/2015 |
| WO | 2010146554 A1 | 12/2010 |

OTHER PUBLICATIONS

Partial European Search Report; Application No. 14003199.8-1706; Applicant: McNeil & NRM, Inc.; Place of Search: Munich; Date of Completion of Search: Feb. 24, 2015.

(Continued)

*Primary Examiner* — James Mackey
(74) *Attorney, Agent, or Firm* — Pearne & Gordon LLP

(57) ABSTRACT

A tire curing press for curing vulcanized tires includes an upper cavity part and a base that at least partially forms the lower cavity part. A movable platen is supported by the base that supports a tire mold section received within the upper cavity part. In various examples, an outer riser column is secured to the base and extends vertically upwards from the base to support the upper cavity part, a multi-height lock ring is disposed upon the base and is configured to interface with an annular flange of the upper cavity part via a bayonet connection, first and second cylinders are configured to apply a substantially equal squeeze pressure to the movable platen to thereby establish a final tire curing pressure within the press cavity, and/or a lock plate is carried by the upper cavity part and includes a locking surface for selective engagement with an abutment shoulder.

11 Claims, 11 Drawing Sheets

(56) References Cited

U.S. PATENT DOCUMENTS

| | | | |
|---|---|---|---|
| 4,927,344 A | | 5/1990 | Amano et al. |
| 5,165,939 A | | 11/1992 | Pizzorno |
| 6,139,301 A | * | 10/2000 | Elleder .................. B29C 33/305 425/28.1 |
| 6,506,040 B1 | | 1/2003 | Singh |
| 6,733,712 B2 | | 5/2004 | Yu |
| 8,366,426 B2 | | 2/2013 | Singh et al. |
| 2011/0200698 A1 | | 8/2011 | Fujieda et al. |

OTHER PUBLICATIONS

Extended European Search Report; Application No. 14003199.8-1706/2857184; Applicant: McNeil & NRM, Inc.; Place of Search: Munich; Date of Completion of Search: Jul. 31, 2015.

European Patent Office; Partial ESR; Date: Jun. 3, 2015; Applicant: McNeil & NRM, Inc.; Application Number: EP 14 00 3199; Place of Search: Munich; Date of Completion of Search: Feb. 24, 2015.

* cited by examiner

TIRE CURING PRESS

CROSS-REFERENCE TO RELATED APPLICATIONS

Not Applicable.

FIELD OF THE INVENTION

The present invention relates generally to tire manufacturing, and more particularly, to a hydraulic tire curing press.

BACKGROUND OF THE INVENTION

Present day tire curing is accomplished by a tire curing press that shapes and cures the green or uncured tire carcass and then discharges the cured tire usually on a conveyor at the rear of the press. Additionally, it has been common to employ tire curing presses in a number of sizes to accommodate the large variety of pneumatic tire sizes required for vehicles of different sizes, weights and performance characteristics. As a result, tire curing presses of different sizes are commonly manufactured for passenger tire, large passenger tire, small truck tire and truck tire applications. Finally, since tire shaping and curing operations are carried out at high pressures, tire curing presses are constructed of heavy steel members which can both manipulate the tire molds during press opening and closing, and also provide the requisite squeeze pressure to withstand the internal pressures encountered during the tire curing operation.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the instant application, a tire curing press is provided, comprises a press cavity for curing vulcanized tires that comprises an upper cavity part and a lower cavity part. A base comprises a main body that at least partially forms the lower cavity part, and an extended support portion that is integral with the main body and extends a distance outwards from the lower cavity part. A movable platen is supported by the base and is vertically movable relative to the base. The movable platen is configured to support a tire mold section that is received within the upper cavity part during a tire curing operation. An outer riser column is secured to the extended support portion of the base and extending vertically upwards from the base, with the upper cavity part being supported by the outer riser column for vertical movement relative to the lower cavity part. A main support frame is configured to support the base upon a support surface, and the main support frame comprises a plurality of discrete support columns fixed to said support surface.

In accordance with another aspect of the instant application, a tire curing press comprises a press cavity for curing vulcanized tires, comprising an upper cavity part and a lower cavity part. The upper cavity part carries an upper platen and the upper cavity part further comprises a projecting annular flange comprising a plurality of teeth. A base comprises a main body that at least partially forms the lower cavity part, and a movable lower platen is supported by the base and is vertically movable relative to the base. The movable lower platen is configured to support a lower tire mold section that is received within the upper cavity part during a tire curing operation. A movable indexing apparatus is interposed between the base and the lower movable platen, and comprises a plurality of steps of differing thickness, whereby moving a selected one of the plurality of steps into alignment between the base and the movable lower platen provides a different height of the lower movable platen relative to the base. A multi-height lock ring is disposed upon the base and configured to interface with the annular flange of the upper cavity part via a bayonet connection. The multi-height lock ring comprises a first set of alternating notches and teeth and a discrete second set of alternating notches and teeth, wherein the second set is disposed vertically above the first set such that the notches of the second set are aligned with the notches of the first set. A distance between the upper platen and the movable lower platen is adjustable based upon using the movable indexing apparatus to adjust a position of the movable lower platen and using the multi-height lock ring to adjust a position of the upper platen.

In accordance with yet another aspect of the instant application, a tire curing press is provided, comprising a press cavity for curing vulcanized tires that comprises an upper cavity part and a lower cavity part. A base comprises a main body that at least partially forms the lower cavity part, and a movable platen is supported by the base and vertically movable relative to the base. The movable platen is configured to support a lower tire mold section that is received within the upper cavity part during a tire curing operation. A first cylinder is mounted on the base comprises a first cylinder rod, and a movable indexing apparatus is interposed between the first cylinder rod and the movable platen and comprises a plurality of steps of differing thickness. Moving a selected one of the plurality of steps into alignment with the first cylinder rod establishes a different partially open position of the lower mold section. A second cylinder is mounted on the base that comprises a second cylinder rod secured to the movable platen for raising the movable platen relative to the base to permit the moving of the indexing apparatus. The second cylinder has an operative stroke length greater than an operative stroke length of the first cylinder. Both of the first and second cylinders are configured to apply a substantially equal squeeze pressure to the movable platen to thereby establish a final tire curing pressure within the press cavity during said tire curing operation.

In accordance with still yet another aspect of the instant application, a tire curing press is provided, comprising a press cavity for curing vulcanized tires that comprises an upper cavity part and a lower cavity part. The upper cavity part is axially aligned and vertically separable from the lower cavity part. A base comprises a main body that at least partially forms the lower cavity part, and an outer riser column is secured to the base and extends vertically upwards from the base. The upper cavity part is supported by the outer riser column for vertical movement relative to the lower cavity part. An abutment shoulder is coupled to the outer riser column, and a lock plate is carried by the upper cavity part and comprises a locking surface. The lock plate is pivotally coupled to the upper cavity part to be movable between a retracted position in which the locking surface is adjacent the upper cavity part and an extended position in which the locking surface is extended outwards from the upper cavity part. An actuator is configured to selectively pivot the lock plate between the retracted position and the extended position. In the extended position, the locking surface is extended outwards from the upper cavity part and is positioned vertically above the abutment shoulder of the outer riser column to thereby inhibit downward vertical movement of the upper cavity part.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
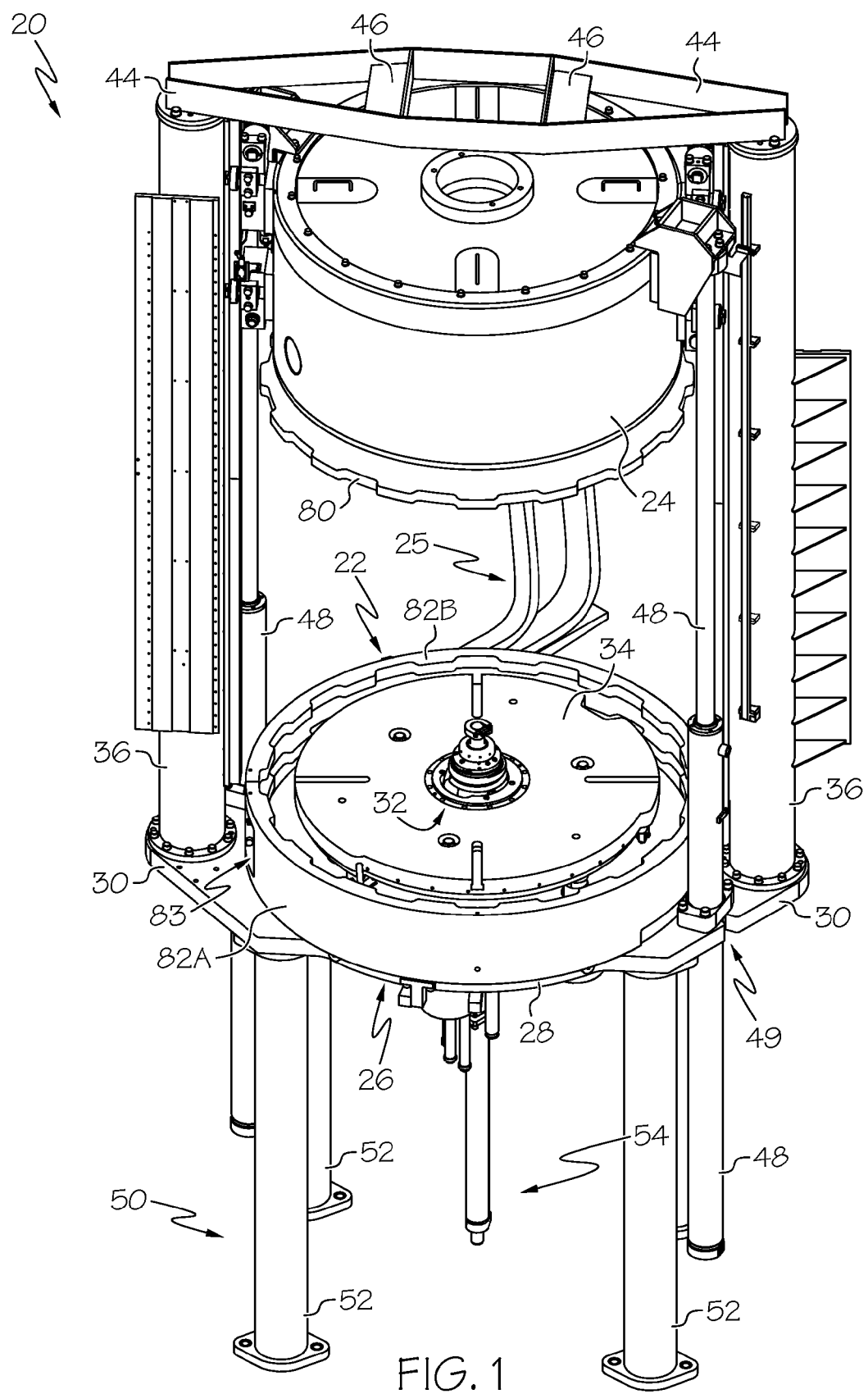
FIG. 1 is a perspective view of an example tire curing press according to the instant application.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to the shown example of FIG. 1, an example tire curing press 20 according to the instant invention is shown. Generally, tire presses and methods for making tires are well known in the art, in which a green tire (not shown) undergoes a curing process in the tire curing press 20. The green tire is placed within a press cavity for curing vulcanized tires that is defined by a lower cavity part 22 and an upper cavity part 24. The upper cavity part 24 is axially aligned and vertically separable from the lower cavity part 22, and moves vertically to and from the lower cavity part 22 respectively to close and open the press 20. At least one protected, flexible, and movable carrier 25 is provided to deliver service power (pneumatic, hydraulic, electric, etc.) to the upper cavity part 24. In FIG. 1, the tire curing press 20 is shown in the open position, in which the upper cavity part 24 is vertically raised upwards from the lower cavity part 22.

The tire curing press 20 further includes a base 26 comprising a main body 28 that at least partially forms the lower cavity part 22, and at least one extended support portion 30 that is integral with the main body 28 and extends a distance outwards from the lower cavity part 22. In the shown example, two extended support portions 30 each extend a distance outwards from the lower cavity part 22. The two extended support portions 30 are arranged generally opposed about a centerline of the base 26, although it is understood that various numbers of extended support portions can be used and can be arranged variously. The main body 28 of the base 26 and the extended support portion 30 of the base 26 are integral, and can be formed together as a single monolithic element (as shown) or can even be made of multiple pieces removably or non-removably coupled together. A center mechanism 32 is centrally mounted in the base 26, which mounts a flexible bladder, diaphragm or bag (not shown) that may take any of a wide variety of shapes to transmit temperature and pressure produced internally by steam to an uncured or green tire band positioned within the tire mold sections for shaping the tire. The upper cavity part 24 provides an interior open space which accommodates, when the press is closed, the upper end of the center mechanism 32, as well as upper and lower tire mold sections (not shown). Additionally, a movable platen 34 is supported by the base 26 and is vertically movable relative to the base 26, as will be described further herein. The movable platen 34 is configured to support one tire mold section (e.g., the lower tire mold section) that is received within the upper cavity part 24 during a tire curing operation.

The tire curing press 20 further includes an outer riser column 36 secured to the extended support portion 30 of the base 26 that extends vertically upwards from the base 26. The outer riser column 36 is a fabricated tubular construction, although it can also have various geometries and constructions. The upper cavity part 24 is supported by the outer riser column 36 for vertical movement relative to the lower cavity part 22. Various numbers of outer riser columns can be used. For example, as shown, a pair of outer riser columns 36 can be coupled each to one of a pair of opposed extended support portions 30, with the upper cavity part 24 being vertically supported between the outer riser columns 36. The outer riser columns 36 are removably secured the extended support portions 30 by bolts or other mechanical fasteners that permit maintenance or replacement, although it is contemplated that the outer riser columns 36 could also be non-removably secured via welding or the like.

Figure 4:
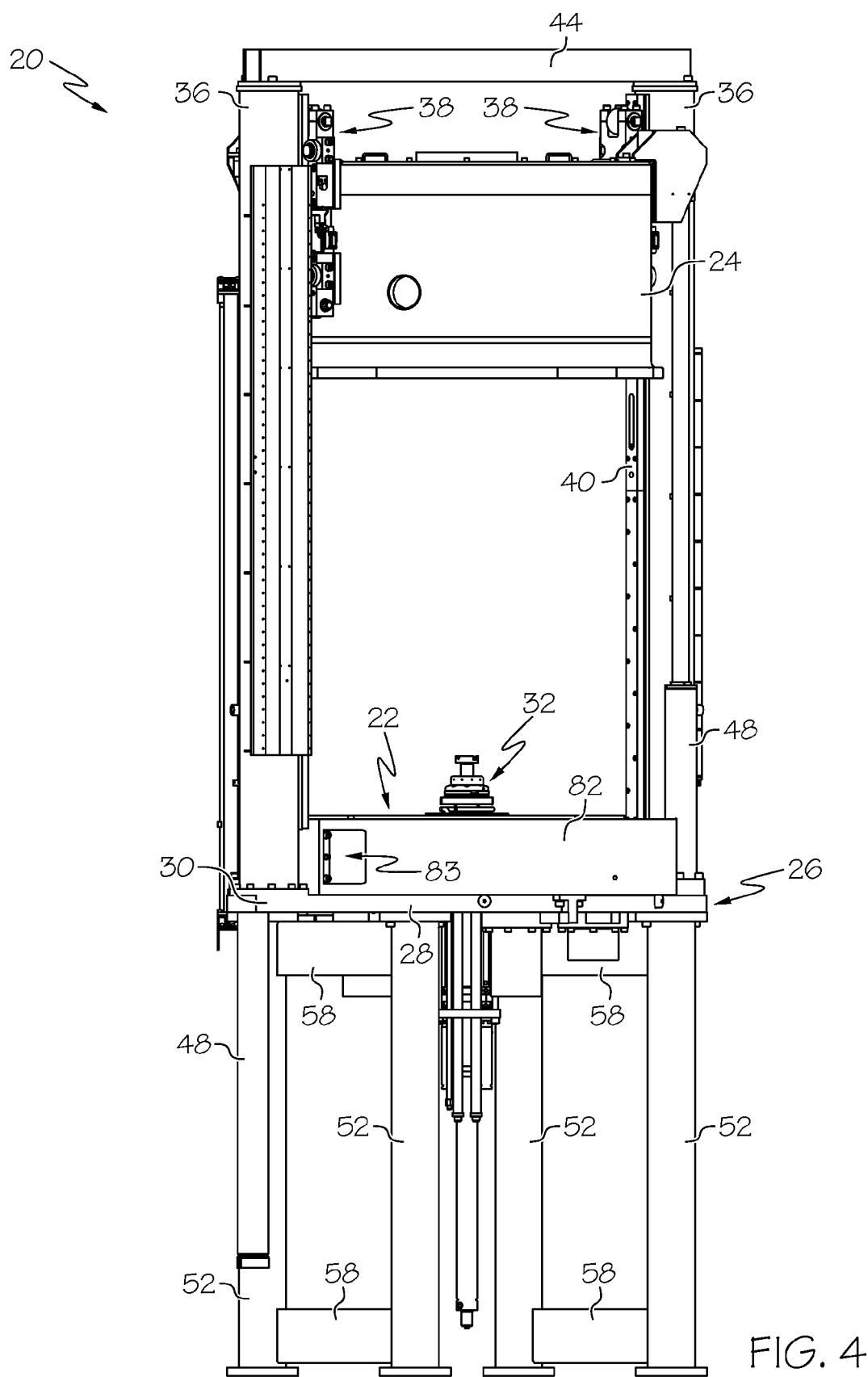
FIG. 4 is a side view of the tire curing press.
Figure 5:
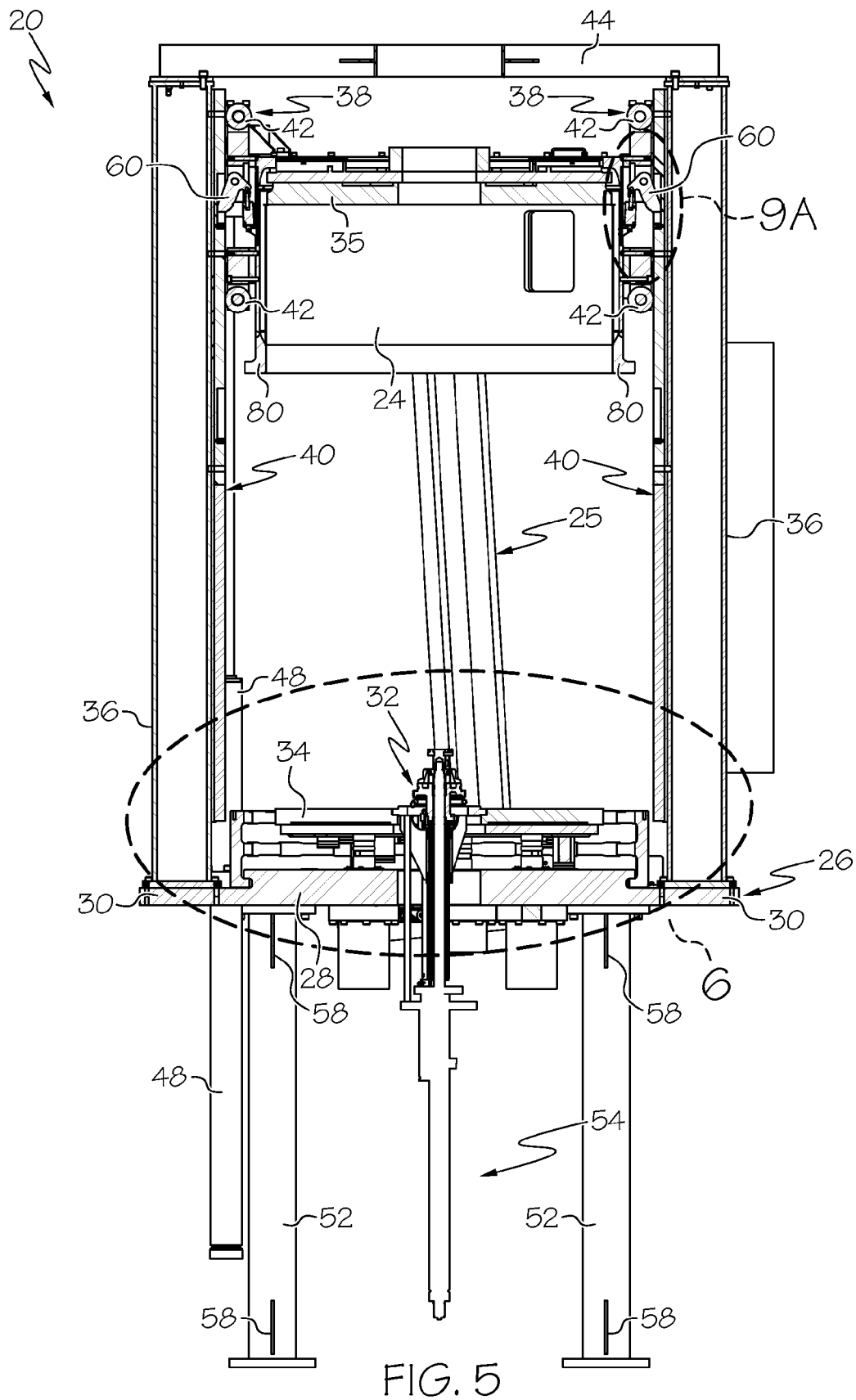
FIG. 5 is a sectional view of the tire curing press taken along line 5-5 of FIG. 2.

The upper cavity part 24 of the press cavity is accurately guided for vertical movement by one or more roller guide assemblies, such as a pair of diametrically opposed roller guide assemblies 38 respectively located inwardly of each of the respective outer riser columns 36. As shown in FIGS. 4-5, the roller guide assemblies 38 are essentially identical, although oppositely disposed, whereby the following reference to a part or parts of any one will be equally applicable to corresponding parts of the others. As best seen in FIG. 5, the roller guide assembly 38 includes a vertical rail 40 secured to the inner side of the respective outer riser column 36. Each rail 40 is substantially parallel to the other. The roller guide assembly 38 also includes upper and lower roller assemblies which are secured to an exterior of the upper cavity part 24 at vertically spaced apart positions. Each of the upper and lower roller assemblies are essentially identical, and each includes a roller 42 that rides on the radially inner side of the rail 40. The roller assemblies 38 at both sides of each upper cavity part 24 act together with the rails 40 to maintain the upper cavity part 24 centered and parallel to the respective lower cavity part 22 (e.g., to inhibit shifting or misalignment) during vertical movement thereof. The upper and/or lower roller assemblies 38 can be urged into engagement with the inner sides of the rails cooperate to maintain the upper cavity part 24 centered to the lower cavity part 22, and to inhibit cocking of the upper cavity part 24.

Figure 2:
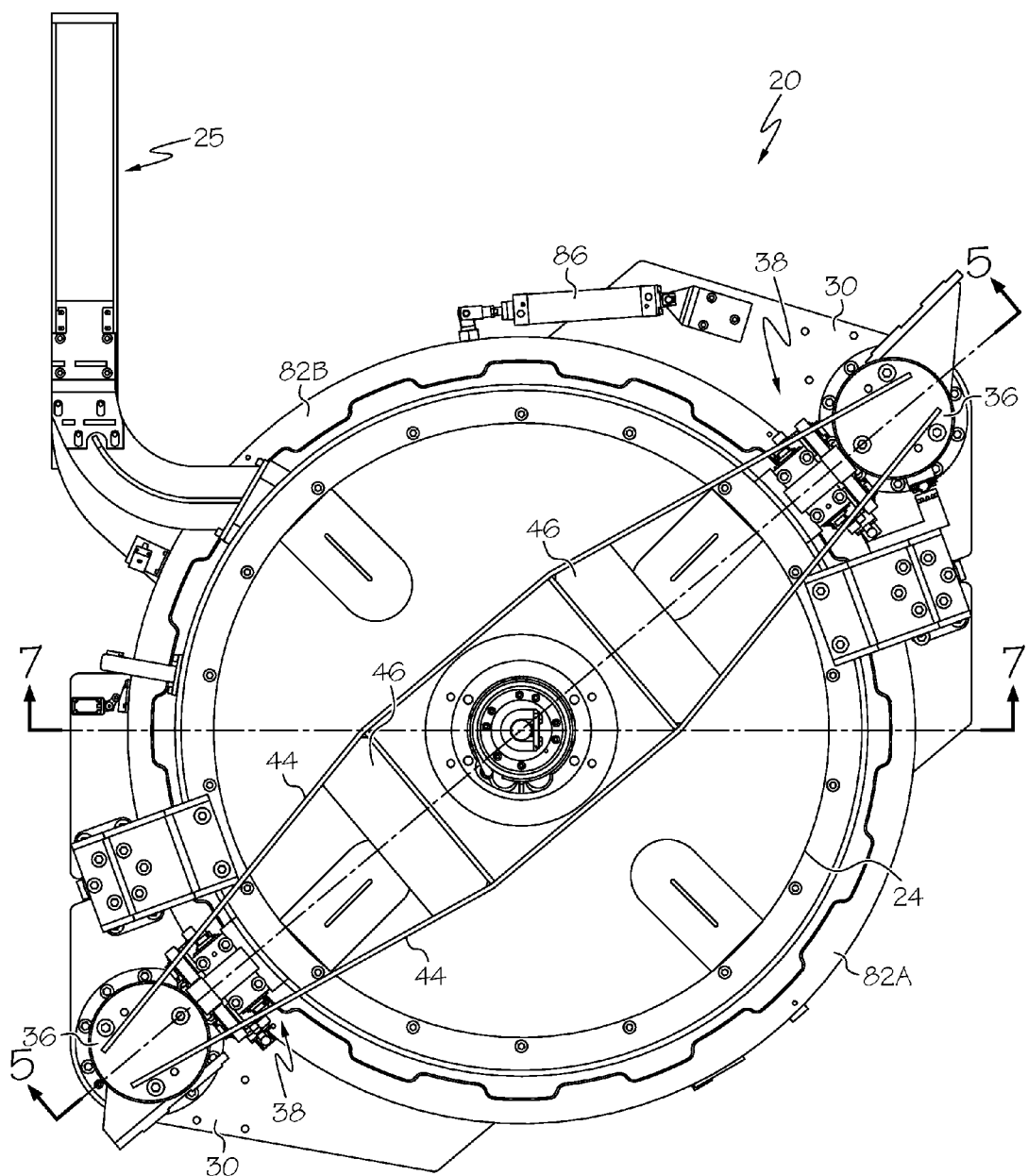
FIG. 2 is a top view of the tire curing press.

Additionally, to inhibit the upper ends of the outer riser columns 36 from flexing away from each other because of loads applied thereto, that can result in a loss of parallelism of the rails 40, the top ends of each outer riser column 36 can be connected to each other by a respective pair of tie rods 44, as seen in FIGS. 1 and 2. The tie rods 44 can even be interconnected to each other by one or more braces 46. The tie rods 44 can be removably or non-removably secured to the outer riser columns 36 by mechanical fasteners, welding, etc. With reference to FIGS. 1 and 4, vertical movement of the upper cavity part 24 of each press cavity is effected by a pair of vertically oriented, relatively long-stroke piston-cylinder lifting assemblies 48. Extension and retraction of the piston-cylinder assemblies 48 raises and lowers the upper cavity part 24. The piston-cylinder assemblies 48 are aligned with the outer riser columns 36, and may also be secured (removably or non-removably) to the extended support portion 30 of the base 26. Additionally, because the piston-cylinder assemblies 48 may have a relatively long stroke length to accommodate the upwards distance traveled by the upper cavity part 24, at least a portion of the piston-cylinder assemblies 48 can be disposed above the base 26 while another portion can be disposed below the base 26. For example, the extended support portion 30 can include a recess 49 or cavity extending a distance therein to at least partially receive each of the piston-cylinder assemblies 48, which can then be secured to the extended support portion 30.

Figure 3:
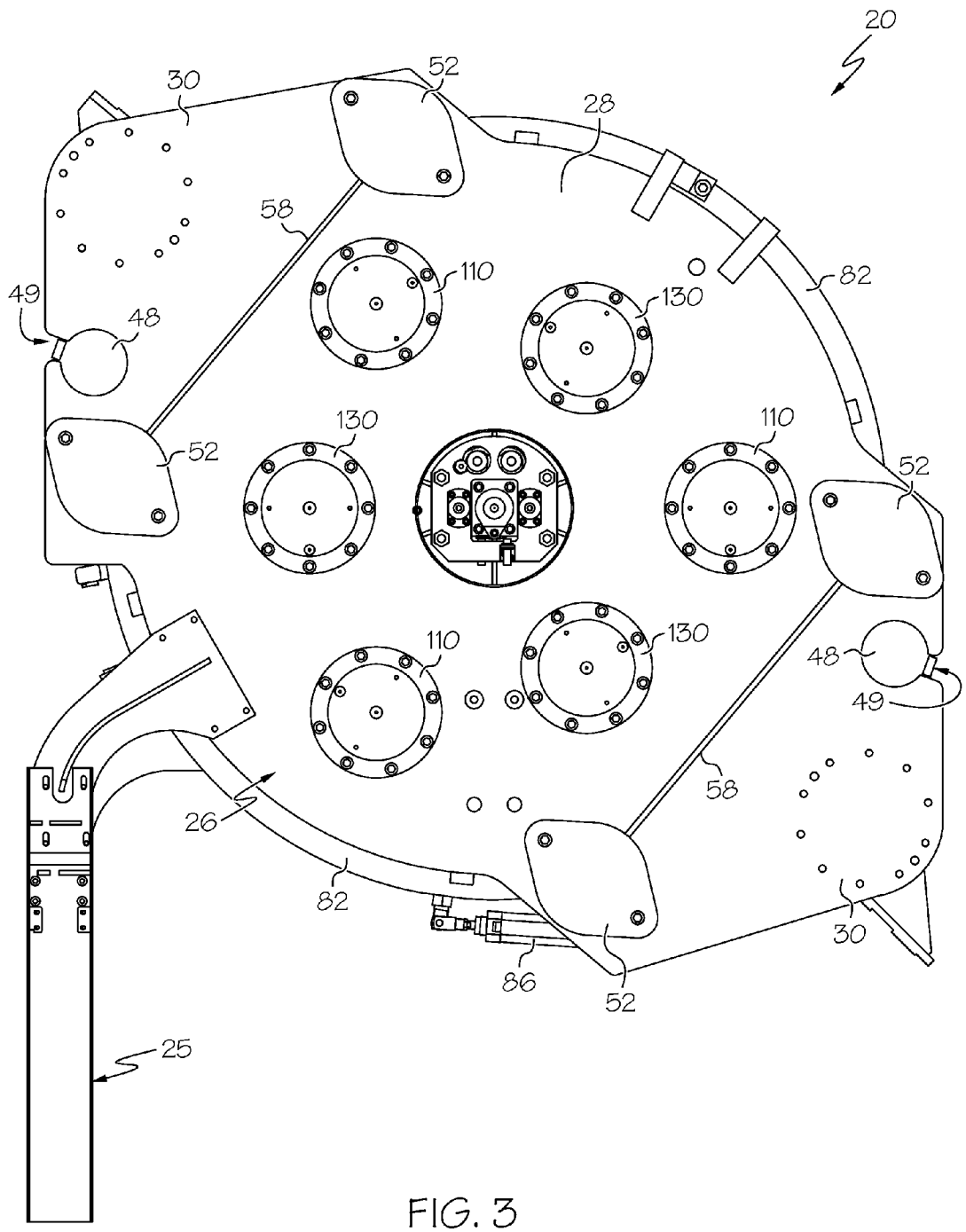
FIG. 3 is a bottom view of the tire curing press.

Conventional tire curing presses include an enclosing support frame that is large, bulky, closes off access underneath the press, and is difficult to maintain. Instead, turning to FIGS. 3-4, a main support frame 50 of the instant application includes a plurality of discrete support columns 52 fixed to the base 26 and to a support surface for supporting the tire curing press 20. The main support frame 50 is configured to support the base 26 upon a support surface, such as a factory floor, a supporting table or frame, etc. The main support frame 50 is further configured to support the outer riser columns 36 above and separated a distance from the support surface. Thus, the main support frame 50 supports the base 26, which in turn supports the outer riser columns 36 via the extended support portions 30. Each of the discrete support columns 52 is a fabricated tubular construction with a mounting flange disposed at each end, although they can also have various geometries and constructions. Due to the nature of the support columns 52, the main support frame 50 provides a large open area 54 between the various support columns 52, accessible from a plurality of various angles around the press, to contain and provide ready access to various operative elements of the tire curing press 20. This can allow for easier assembly, disassembly, maintenance, repair, etc. of various parts, such as the outer riser columns 36, the center mechanism 32, utility service hookups, and other elements. For example, operational power for operation of the tire curing press can be provided by one or more utility services, such as electric, pneumatic, hydraulic, gas, etc. In one example, the motive power for elements of the tire curing press 20 can be provided by hydraulic and pneumatic utility services, although a low voltage electrical system (e.g., 24 volts or the like) can also be provided for use with a control system, sensors, audio/video indicators, etc.

As shown, four discrete support columns 52 can be used, although various other numbers and arrangements are contemplated. Each of the discrete support columns 52 is independently secured (removably or non-removably) to the base 26 and to the support surface via the mounting flanges. Even so, to provide additional support along multiple axes to accommodate the various dynamic loads generated during press operation, an intermediate brace 58 can extend between at least two of the plurality of discrete columns 52 of the main support frame 50. The intermediate brace 58 can include plate steel, for example, removably or non-removably secured to each of the columns 52. For example, as shown in FIG. 4, one intermediate brace 58 can be located between and towards the bottom of two of the plurality of discrete columns 52, and another intermediate brace 58 can be located between and towards the top of the same support columns 52. Similar intermediate braces can be used with the other pair of columns 52, although various other numbers and arrangements of braces are also contemplated. It is further contemplated that one or more braces can be used between one of the columns 52 and the base 26, or even between one of the braces and the base 26.

As described herein, the upper cavity part 24 is supported by the outer riser column 36 for vertical movement relative to the lower cavity part 22. During a tire curing operation, the upper cavity part 24 is lowered to form the press cavity with the lower cavity part 22. Afterwards, the upper cavity part 24 is moved vertically upwards and separated from the lower cavity part 22 so that the cured tire can be removed from the press to make room for the next green tire to be loaded into the press. However, when the upper cavity part 24 is in the raised position, it is desirable to maintain a safe working environment for the users by utilizing a locking structure to ensure that the upper cavity part 24 is in a locked condition against downward movement while the tires are being loaded or unloaded from the press.

In one example, a lock plate 60, as shown in FIG. 5, is carried by the upper cavity part 24 and includes a locking surface 62 for selective engagement with an abutment shoulder 65 coupled to an adjacent outer riser column 36. As shown, a pair of lock plates 60 can be disposed on opposite sides of the upper cavity plate 24 (e.g., adjacent each outer riser column 36), although different numbers and locations of the lock plate(s) are contemplated. The lock plate 60 and locking surface 62 are disposed on an exterior surface of the upper cavity part 24, such as near the roller guide assembly 38. For example, the lock plate 60 can be disposed vertically between a pair of rollers 42, or at other locations. Preferably, the locking surface 62 of the lock plate 60 is positioned on the upper cavity part 24 so as to be visible to a user located near the base 26 to thereby provide a visual indication to the user of whether the upper cavity part 24 is in a locked condition or an unlocked condition. In other words, while sensors, visual indicators and/or audible indicators can also be used to indicate whether the upper cavity part 24 is in a locked or unlocked condition, the user can also manually verify the locking condition of the upper cavity part 24 by viewing the position of the lock plate 60.

Figure 9A:
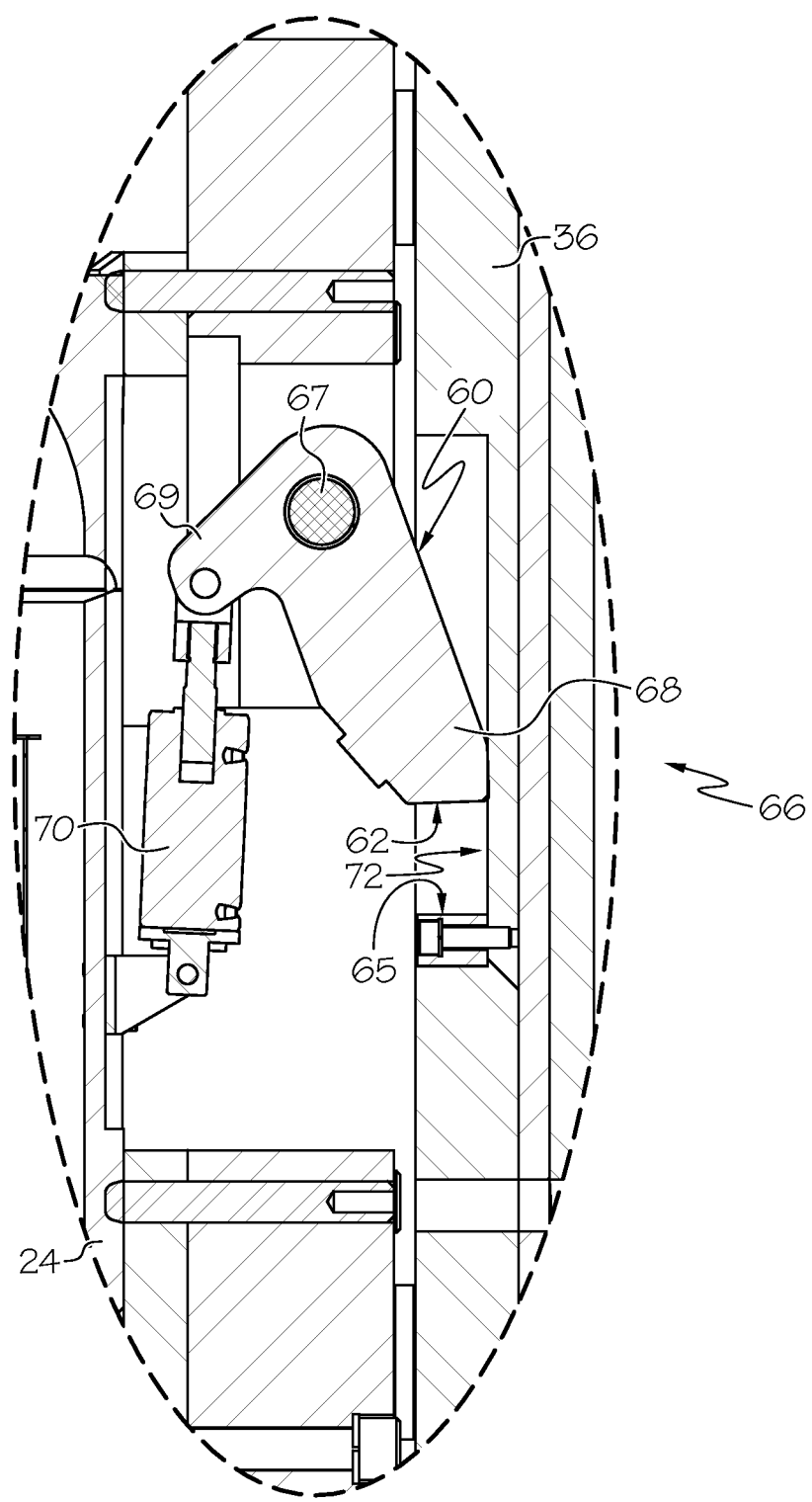
FIG. 9A is another enlarged, partial detail view of FIG. 5.
Figure 9B:
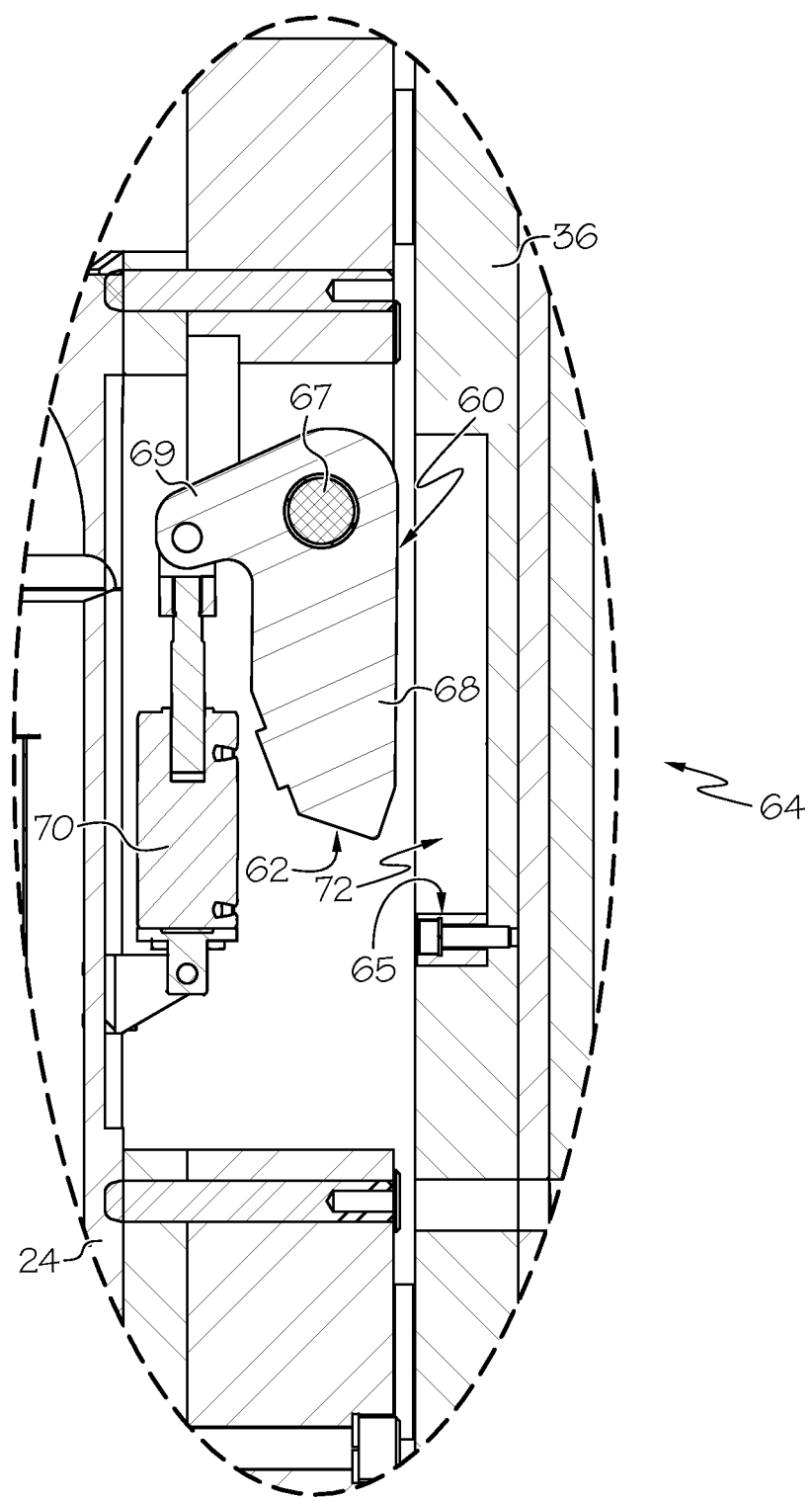
FIG. 9B is similar to FIG. 9A, shown in an alternative configuration.

Turning briefly to FIGS. 9A-9B, one example lock plate 60 includes a plate with the locking surface 62 disposed at one end thereof and configured to engage with the abutment shoulder 65 coupled to an adjacent outer riser column 36. The lock plate 60 is pivotally coupled to the upper cavity part 24 to be movable between a retracted position 64 (see FIG. 9B), in which the locking surface 62 is adjacent the upper cavity part 24, and an extended position 66 (see FIG. 9A), in which the locking surface 62 is extended outwards from the upper cavity part 24. For example, the lock plate 60 can be pivotally coupled to the upper cavity part 24 by a pin 67 or the like received within a hole of the lock plate 60. An operative arm 68 of the plate 60, carrying the locking surface 62, can extend away from the hole and pin 67 in a first direction, and an actuator arm 69 of the plate 60 can extend away from the hole and pin 67 in a different second direction for connection to an actuator 70 that drives pivoting movement of the lock plate 60 about the pin 67. The actuator 70 is configured to selectively pivot the lock plate 60 between the retracted position 64 and the extended position 66. In the extended position 66, the locking surface 62 is extended outwards from the upper cavity part 24 and is positioned vertically above the abutment shoulder 65 of the outer riser column 36 to thereby inhibit downward vertical movement of the upper cavity part 24. The locking surface 62 may or may not be in direct contact with the abutment shoulder 65 when the lock plate 60 is extended outwards to the locked condition. For example, as shown in FIG. 9A, the locking surface 62 can be positioned vertically above, and separated a distance from, the abutment shoulder 65. Such as construction can reduce wear on the associated parts, while still providing a safe locked condition. For example, if upper cavity part 24 were to inadvertently be lowered, the locking surface 62 of the lock plate 60 would move downward until it engages the abutment shoulder 65 to thereby prevent any further lowering of the upper cavity part. Alternatively, the locking surface 62 could be positioned vertically above and in contact with the abutment shoulder 65, as desired, so that substantially no movement of the upper cavity part 24 is permitted.

Various types of actuators 70 can be used, such a pneumatic cylinder, hydraulic cylinder, electric motor, etc. Thus, extension of the actuator cylinder bears upon the actuator arm 69 to cause the lock plate 60 to pivot about the axis of the pin 67 and thereby move the operative arm 68 and locking surface 62 inwards or outwards relative to the abutment shoulder 65. The locking surface 62 can include an angled surface that can be arranged relatively parallel to the abutment shoulder 65 after the lock plate 60 is pivoted outwards to the locked condition. Thus, the locking surface 62 can engage the abutment shoulder 65 in a relatively flat face-to-face manner to thereby increase, such as maximize, the surface contact area. Finally, when it is desired to move the upper cavity part 24 downwards (e.g., to start a tire curing operation), the actuator 70 can pivot the lock plate 60 back to the retracted position whereby the locking surface 62 is laterally separated (e.g., moved inwards) from the abutment shoulder 65 to thereby permit downward vertical movement of the upper cavity part 24.

Various configurations of abutment shoulders 65 can be used. In one example, as shown in FIGS. 9A-9B, a recess 72 can extend at least partially into an upper portion of the outer riser column 36, and the abutment shoulder 65 can be disposed on interior portion of the recess 72. Thus, when the lock plate 60 is moved to the extended and locked position 66, the operative arm 68 is at least partially moved into the recess 72 so that the locking surface 62 is located vertically above the abutment surface 65. Conversely, when the lock plate 60 is moved to the retracted and unlocked position 64, the operative arm 68 is removed from the recess 72 so that the locking surface 62 is laterally separated from the abutment shoulder 65.

Figure 9C:
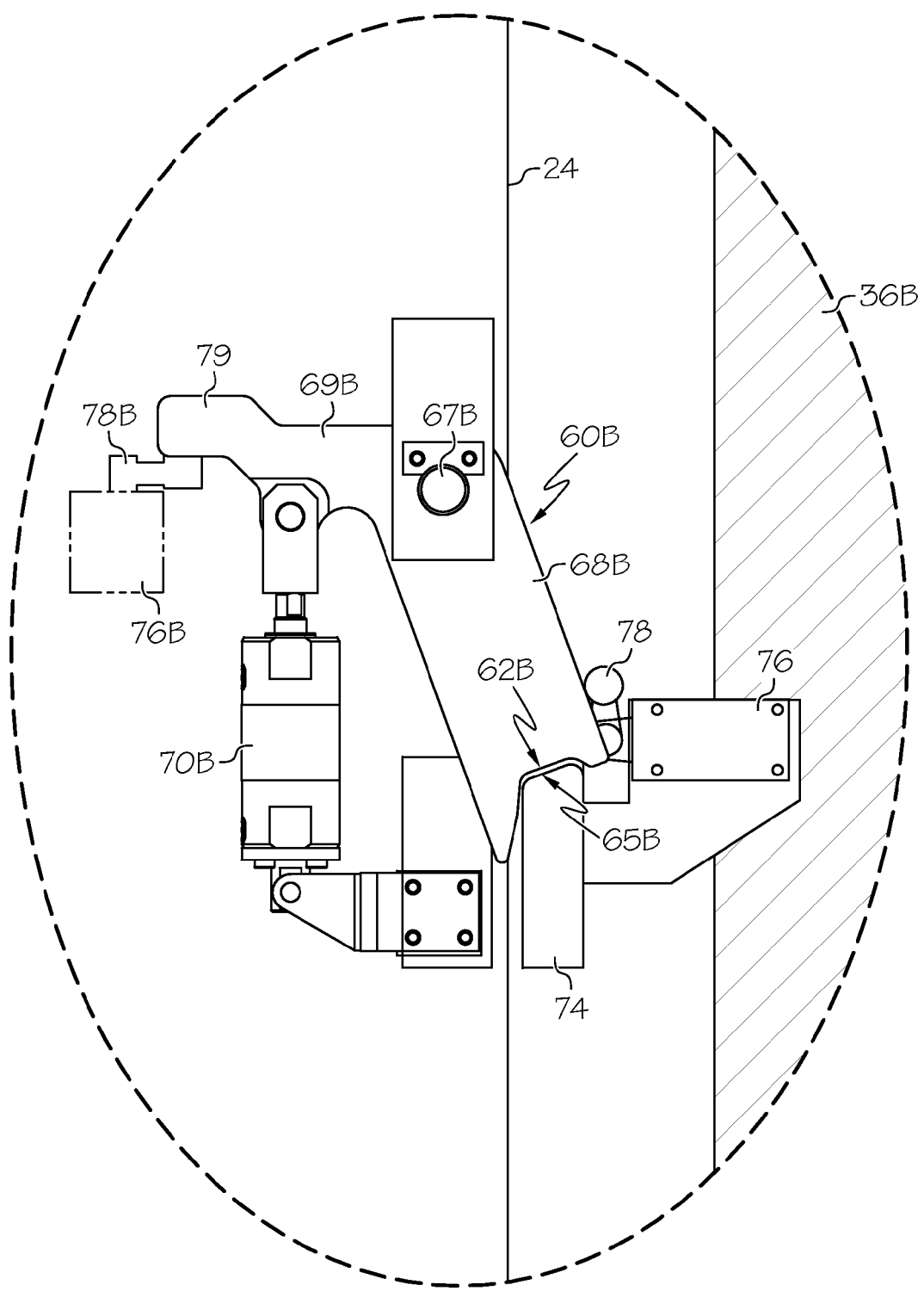
FIG. 9C is similar to FIG. 9A, but shows yet another alternative embodiment.

Turning now to FIG. 9C, another configuration of an abutment shoulder 65B is shown. In this example, the lock plate 60B and actuator 70B can be similar to that described above. However, an extension plate 74 can be secured to and project a distance outwards from an upper portion of the outer riser column 36B, and the abutment shoulder 65B can be disposed on an exterior portion of the extension plate 74. Thus, where it may be difficult or inconvenient to manufacture a recess into the outer riser column 36, or where a particular location of the abutment shoulder is desired, the extension plate 74 can be removably or non-removably coupled to the outer riser column 36 to provide the abutment shoulder 65B positioned for interaction with the lock plate 60B. Thus, when the lock plate 60B is moved to the extended and locked position, as shown, the operative arm 68B is moved towards the extension plate 74 so that the locking surface 62B is located vertically above the abutment surface 65B. As described above, the locking surface 62B is vertically above the abutment surface 65B, and may be in contact with or separated a distance from the abutment surface 65B. Conversely, when the lock plate 60B is moved to the retracted and unlocked position, the operative arm 68B moved away (e.g., laterally inwards) from the extension plate 74 so that the locking surface 62B is laterally separated from the abutment shoulder 65B and the upper cavity part 24 can be moved downwards. Additionally, the end of the operative arm 68B may include cammed or ramped surface(s) to facilitate engagement or disengagement of the locking surface 62B with the abutment surface 65B, and/or may even include an extended alignment portion to maintain alignment between the locking surface 62B and the extension plate 74.

In addition or alternatively, any of the lock plate and abutment shoulder configurations described above can also include one or more sensors to provide an additional indication of whether the lock plate is in the locked or unlocked condition. For example, as shown in FIG. 9C, a sensor 76 can include a contact element 78 that is selectively pushed by movement of the operative arm 68B of the lock plate 60. The contact element 78 preferably has a resilient element, such as a linear or pivoting plunger, that is resiliently biased outwards so as to be struck by movement of the operative arm 68B. Various other contact or non-contact sensors could also be used, such as an optical sensor, ultrasonic sensor, hall effect sensor, etc. The sensor 76 can sense the position of the contact element 78, and provide a control indication to a main controller of the tire curing press as to the locked or unlocked condition of the upper cavity part 24. Placement of the sensor 76 adjacent the operative arm 68B can provide direct evidence of the relative positions of the locking surface 62B and the abutment surface 65B of the extension plate 74. In addition or alternatively, the lock plate 60B could further include a third arm 79 that pivots together with the remainder of the lock plate 60B and can be configured to operate a sensor 76B. Thus, a contact element 78B could be driven by the third arm 79 instead of by the operative arm 68B, which could provide separation of the sensing component and the extension plate 74. Where multiple lock plates are used, any or all can include a sensor 76.

Turning back to FIGS. 5-6, the upper cavity part 24 is vertically separable from the lower cavity part 22 and moves vertically to and from the lower cavity part 22 respectively to close and open the press. When lowered to one of the phantom line positions shown in FIG. 6, a radially projecting annular flange 80 at the lower end of the cylindrical shell of the upper cavity part 24 interfits with a bayonet-style lock ring 82 supported on the base 26. The lock ring 82 can be journaled upon the base 26 for rotation relative to the upper cavity part 24 to thereby provide the bayonet locking connection. For example, the lock ring 82 can be journaled on a horizontally extending flange or lip of the base 26, and possibly on the extended support portions 30, by a sliding interface or even by rollers or the like circumferentially spaced around the base 26. The lock ring 82 can be rotated variously, such as by a piston-cylinder assembly 86 (see FIG. 2) pivotally coupled between the base 26 and the lock ring 82. Actuation of the piston-cylinder assembly 86 causes extension of the piston to thereby cause rotation of the lock ring 82 relative to the upper cavity part 24. The piston cylinder assembly 86 can be pneumatic, hydraulic, electrically powered, and/or other types of mechanisms could be used to cause rotation of the lock ring 82 relative to the upper cavity part 24.

Figure 6:
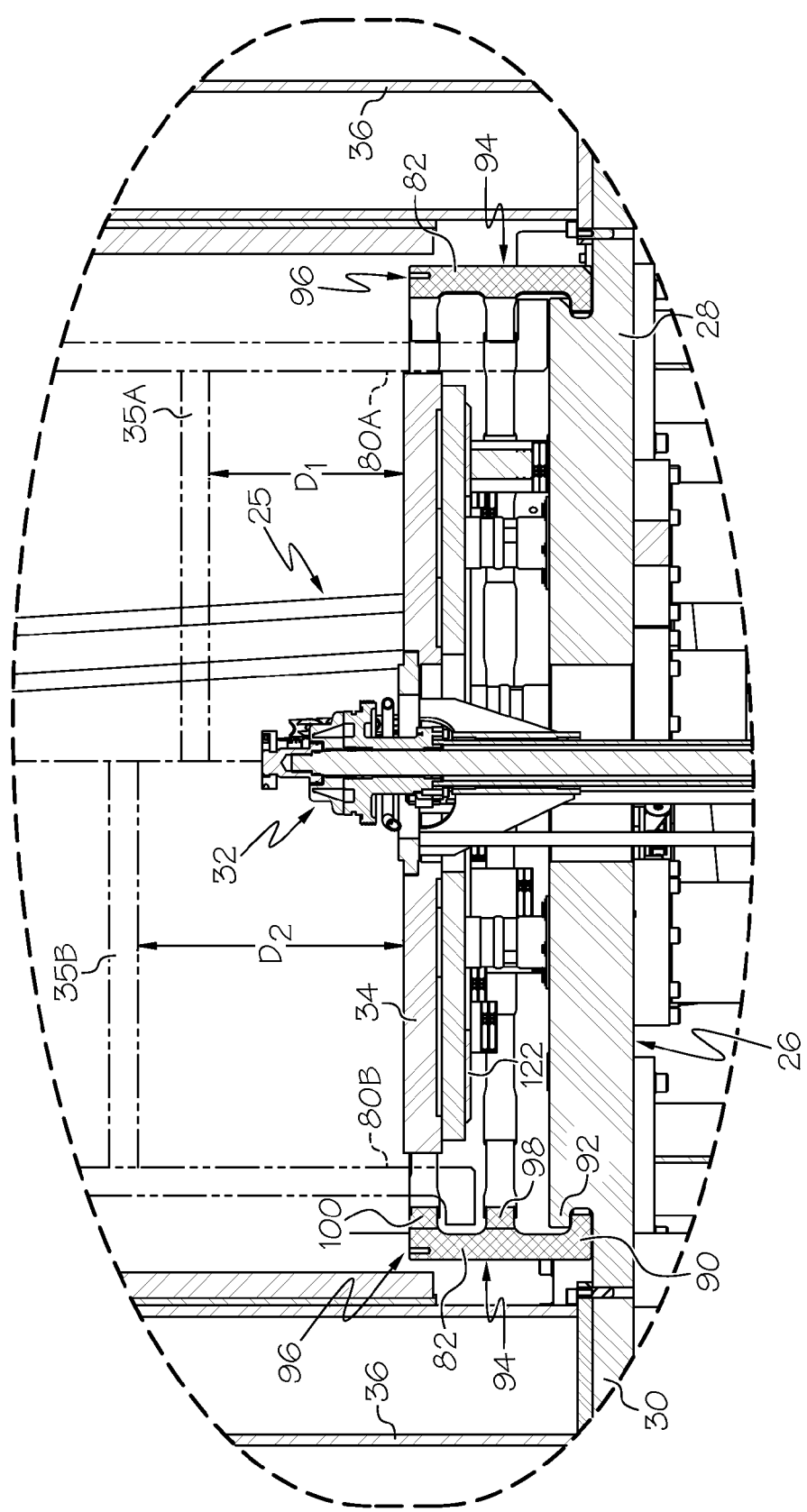
FIG. 6 is an enlarged, partial detail view of FIG. 5.

The lock ring 82 further comprise a lowermost annular leg 90 that projects beneath a lip 92 of the base 26 to thereby secure the lock ring 82 against vertical movement relative to the base 26. During rotation of the lock ring 82, the lowermost leg 90 either slides against the base 26 or rides on rollers mounted to the base 26. The lock ring 82 may also have dependently mounted thereto circumferentially arranged rollers, etc. In order to assemble the lock ring 82 onto the base 26, the lock ring 82 can comprise a plurality of discrete curved sections 82A, 82B that are coupled together to form a generally circular geometry, which can be beneficial for assembly and/or maintenance and repair purposes. For example, as shown in FIGS. 1 and 6, each of the discrete curved sections 82A, 82B can have a generally C-shaped in cross-section. The discrete curved sections 82A, 82B are assembled onto the base 26 such that the lowermost annular leg 90 is positioned beneath the lip 92, and thereafter the curved sections 82A, 82B are removably secured together by various mechanical fasteners 83, etc. Still, it is contemplated that the curved sections 82A, 82B could be non-removably secured together (e.g., welded, etc.) after assembly.

In order to accommodate various tire sizes for the large variety of vehicles of different sizes using a single press, the lock ring 82 can comprise a multi-height lock ring configured to interface with the annular flange 80 of the upper cavity part 24 to thereby provide a tire curing press cavity of different sizes. The multi-height lock ring 82 comprises a first set 94 of alternating notches and teeth, and a discrete second set 96 of alternating notches and teeth. The second set 96 is disposed vertically above the first set 94 such that the notches of the second set 96 are aligned with the notches of the first set 94. For example, as shown in FIG. 6, the vertical offset of the first and second sets 94, 96 of notches and teeth provide multiple height adjustment positions for engagement with the outer annular flange 80 of the upper cavity part 24. The multi-height lock ring 82 can be a monolithic element that comprises both of the first and second sets 94, 96, or alternatively multiple lock rings can be stacked on top of each other and secured together to provide the first and second sets 94, 96. Where multiple lock rings are utilized, each may be movable together or independently. If the rings are moved independently, it can be beneficial to lock together or otherwise synchronize the rings to align the notches so that the outer annular flange 80 of the upper cavity part 24 can be easily received therein. Additionally, while the multi-height lock ring 82 is shown with only two sets 94, 96 of notches and teeth, it is understood that three or more sets of notches and teeth can similarly be utilized to provide even more tire press cavity sizes.

In the shown example, both of the middle leg 98 and the upper leg 100 of the lock ring 82 are formed with the alternating notches and teeth shown in FIG. 1. The radially projecting annular flange 80 at the lower end of the cylindrical shell of the upper cavity part 24 is similarly formed with corresponding alternating teeth and notches, with the teeth being designed to fit vertically through the notches of the lock ring 82 in the open position, and to lie beneath the teeth of the lock ring 82 when the ring is rotated to a closed position. When the press is open, the lock ring 82 will be in its open position as achieved by the piston cylinder assembly 86. With the lock ring 82 in the open position and the upper cavity part 24 descending, the teeth of the annular flange 80 will pass through the notches in the upper leg 100 of the lock ring 82, and possibly also pass through the notches in the middle leg 98 of the lock ring 82 depending upon the desired final height of the upper cavity part 24. For this reason, as described above, the second set 96 of notches and teeth of the lock ring 82 is disposed vertically above the first set 94 such that the notches of the second set 96 are aligned with the notches of the first set 94. When the tire press cavity is closed, the upper cavity part 24 will finally come to rest at approximately one of the positions shown in FIG. 6 with the teeth of the annular flange 80 being positioned in the notches of the lock ring 82. For example, as shown towards the right side of FIG. 6, the annular flange 80A is shown positioned for engagement with the middle leg 98 and first set 94 of notches and teeth of the lock ring 82 to provide a relatively smaller press cavity. In an alternative configuration, as shown towards the left side of FIG. 6, the annular flange 80B is shown positioned for engagement with the upper leg 100 and second set 96 of notches and teeth of the lock ring 82 to provide a relatively larger press cavity. Then, when the upper cavity part 24 is in the desired position, the piston-cylinder assembly 86 is extended to rotate the lock ring 82 to move the teeth of the upper leg 100 or middle leg 98 to a position above the teeth of the annular flange 80 of the upper cavity part 24 and thereby mechanically lock the upper cavity part 24 to the bottom cavity part 22. While both configurations of the annular flange 80A, 80B are shown in FIG. 6, it is understood that this was done for convenience using a single drawing.

When the press closes and is mechanically locked, the lower and upper cavity parts 22, 24 of the press cavity will be joined to form a single cavity or chamber in which is situated an upper mold platen and the vertically movable lower mold platen 34. The upper platen 35 carried by the upper cavity part 24 may be insulated from the lower movable platen 34 by insulation plates (not shown), and/or the lower movable platen 34 may be surrounded both below and at the sides with insulating material. Once mechanically locked, hydraulic clamps may be operated to close the upper and lower mold parts, respectively secured to the upper and lower plates, under considerable pressure to resist expansion forces occurring within the tire during bladder shaping and cure. As the hydraulic clamps come up to full clamp pressure, the force reaction extends through the upper cavity part 24 back via the lock ring 82 and to the base 26 to thereby resist the clamping force.

Figure 7:
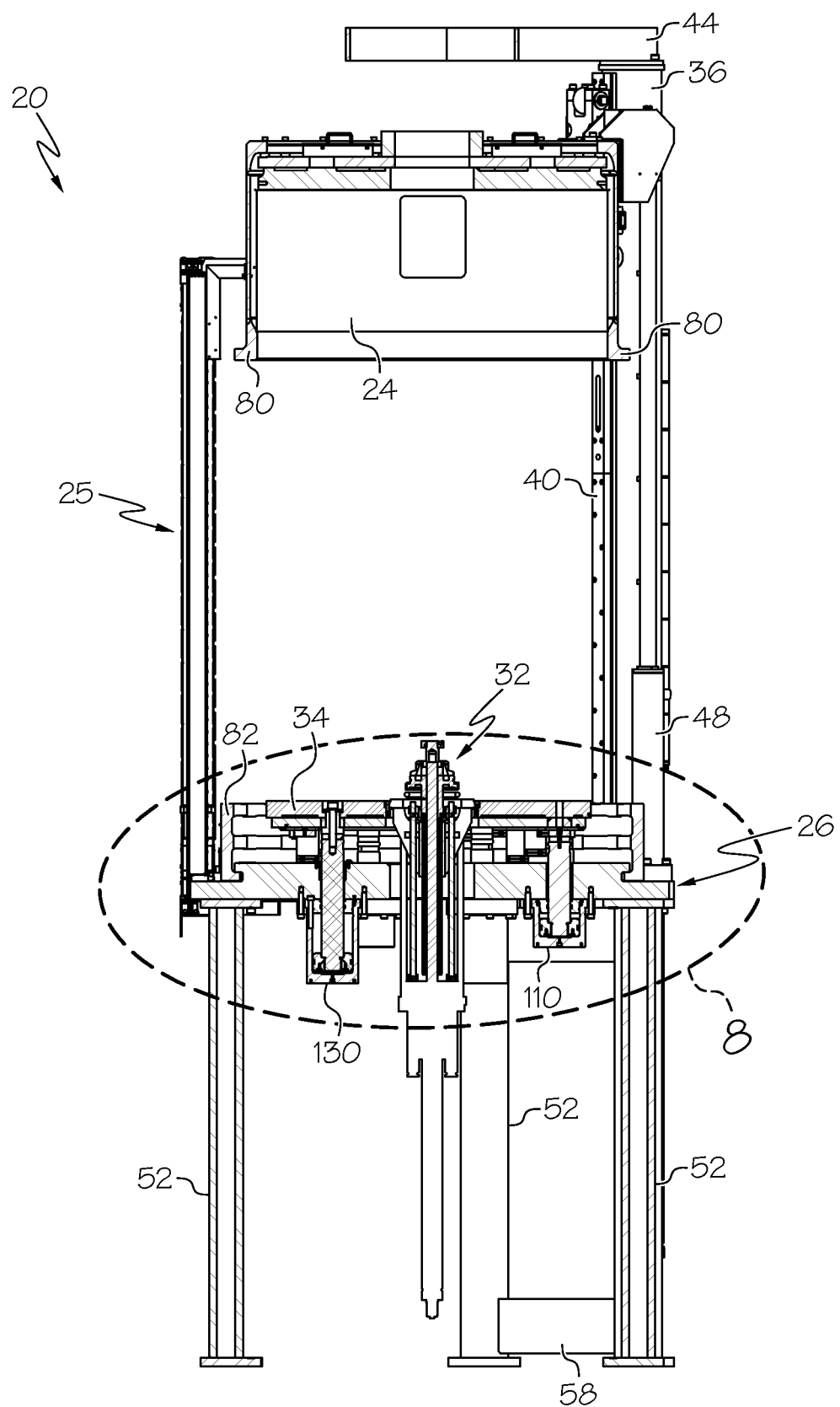
FIG. 7 is a sectional view of the tire curing press taken along line 7-7 of FIG. 2.
Figure 8:
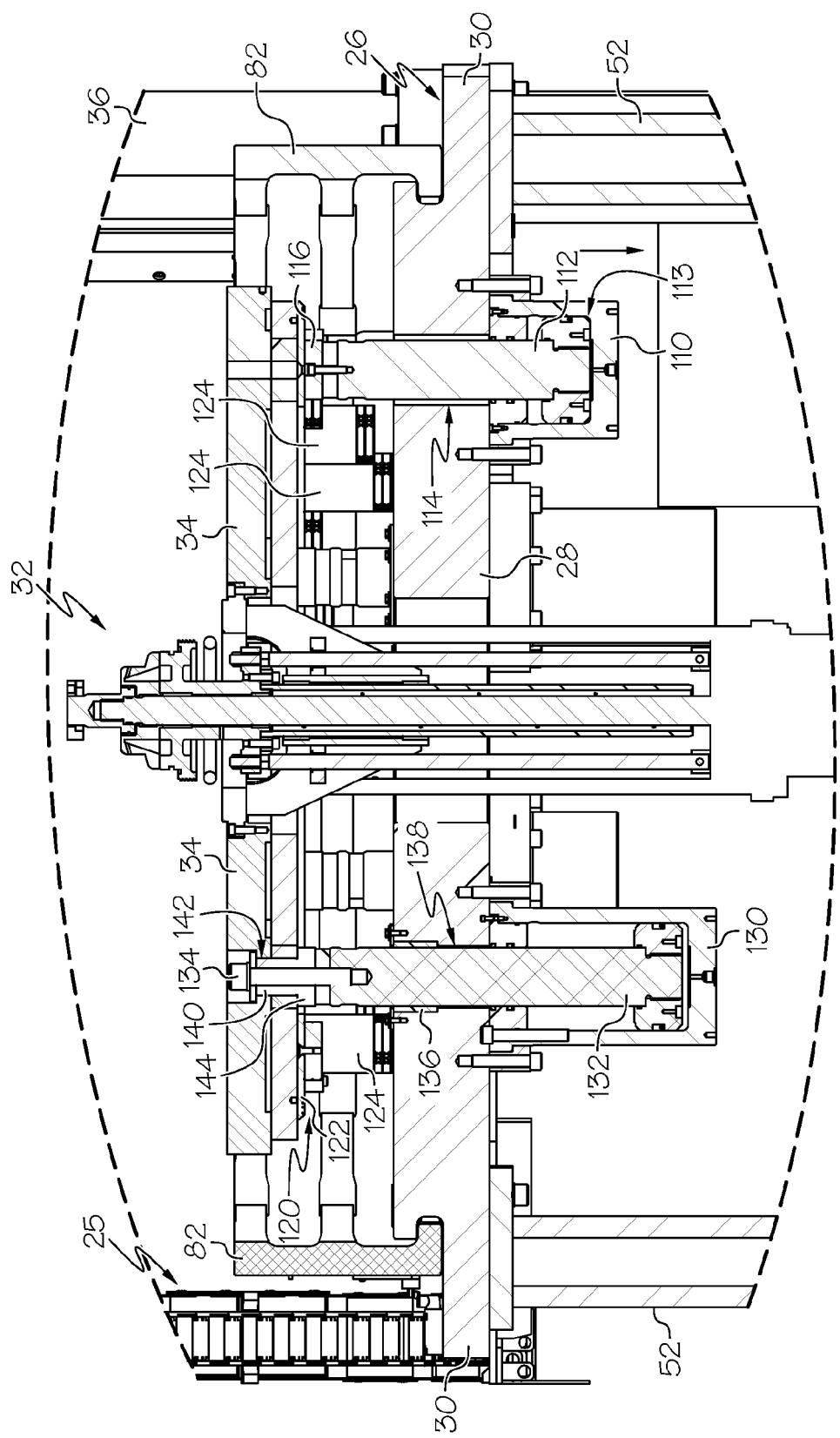
FIG. 8 is an enlarged, partial detail view of FIG. 7.

Turning now to FIGS. 7-8, the hydraulic clamps for the curing press will now be discussed in greater detail. Conventionally, various approaches have been taken over the years to provide mold height adjustment in tire curing presses to accommodate upper and lower mold sections having different combined heights when in the fully closed position. Generally, mold height adjustment mechanisms have employed spacers of different thickness or adjusting screw and nut arrangements to achieve the variable adjusted positioning of press components to optimize operating with mold sections of different heights. In the instant application, mold height adjustment for a plurality of mold sizes is provided by an indexing ring with discrete vertical steps of differing vertical heights that are selectively interposed between squeeze cylinder rods and a lower movable platen of the press. In general, some operational features of the movable indexing apparatus 120 can be similar to that described in U.S. Pat. No. 6,506,040, which is incorporated herein by reference.

As described herein, the movable platen 34 is supported by the base 26 and is configured to support a tire mold section (e.g., the lower tire mold section) that is received within the upper cavity part 24 during a tire curing operation. The movable platen 34 and lower mold section carried thereon are supported and vertically positioned relative to the base 26 of the press 20. If desired, a layer of insulation may be used to restrict heat transfer downwardly of the lower mold section. While conventional mold height adjustment mechanisms utilized separate lift cylinders and squeeze cylinders with independent functions, in which the lift cylinders were unable to apply squeeze pressure to the movable platen, the mechanism herein utilizes both lift cylinders and separate lift and squeeze cylinders that are all configured to apply a substantially equal squeeze pressure to the movable platen 34.

A first set of cylinders 110, which are used as squeeze cylinders, are mounted on the base 26 and each comprise a first movable cylinder rod 112. During operation, the first set of cylinders 110 press upon the movable platen 34 and lower mold section to effect final closing of the mold parts and apply the requisite squeeze pressure thereto during tire curing. The first set of cylinders 110 are preferably equiangularly spaced about the base 26 (see FIG. 3), such as three lift cylinders positioned at substantially 120-degree angular spacing (although other configurations are contemplated). More or less squeeze cylinders could be utilized, although the use of "dual-purpose" lift and squeeze cylinders can reduce the overall number of cylinders used. The squeeze cylinders 110 are mounted on the underside of the base 26 by a plurality of suitable mechanical fasteners. The squeeze cylinders 110 have cylinder rods 112 that extend through oversized bores 114 in the base 26. Each of the cylinder rods 112 may have an insulating cap 116 at the upper end thereof to restrict the transfer of heat from the movable platen 34 to the squeeze cylinders 110, and the insulating caps 116 may seat one or more shims that can be used to effect leveling of the movable platen 34.

The mold height adjustment mechanism further includes a movable indexing apparatus 120 interposed between the first cylinder rod 112 and the movable platen 34 that includes an indexing ring 122 with a plurality of steps or risers 124 of differing thickness. The indexing ring 122 radially and circumferentially overlies the squeeze cylinders 110. In operation, moving a selected one of the plurality of steps or risers 124 into alignment with the first cylinder rod 112 of each squeeze cylinder 110 establishes a different partially open position of the lower mold section. The indexing ring 122 is suspended in movable proximity to the movable platen 34 by a plurality of rollers that both radially and axially position the indexing ring 122 for selective rotational motion relative to the movable platen 34. The rollers are positioned by a plurality of roller mounting brackets which are attached to the underside of the movable platen 34 by mechanical fasteners, and on which the rollers are freely rotatably mounted. The rollers retain the indexing ring 122 in position by the rollers having a horizontal surface, which contacts the bottom surface of the indexing ring 122, and an angled surface, which contacts a beveled corner of the indexing ring 122 to thus both radially and axially position the indexing ring relative to the movable platen 34. It will be appreciated that separate rollers could be configured and located to separately individually impart the radial and axial forces requisite to positioning and rotatably supporting the indexing ring 122.

The indexing ring 122 carries the plurality of discrete steps or risers 124 to establish differing selected mold height positions to accommodate different predetermined molds having different vertical heights when mounted in the press. The steps or risers 124 can be cylindrical blocks of a selected height having a diameter which is preferably substantially the same as the diameter of the first cylinder rods 112 of squeeze cylinders 110, and are held in place on the indexing ring 122 by suitable mechanical fasteners. In addition to the positions established by the steps or risers 124, an additional position can be established by the thickness of the indexing ring 122 where no step or riser is present. A plurality of groupings of the steps or risers 124 can be provided, with a grouping located proximate to and operatively interrelating with each of the squeeze cylinders 110. While three positions are shown and described herein, thereby providing three different mold height adjustments, it is to be appreciated that more or less positions could be employed on each of the groupings. The indexing ring 122 can be provided with a manual actuating member (e.g., hand knob) or powered actuating member (pneumatic, hydraulic, electric) to facilitate rotating and positioning of the indexing ring 122 for mold height adjustment. The indexing apparatus 120 can also be provided with a locking assembly to lock the indexing ring 122 in the various mold height positions.

Turning briefly back to FIG. 6, the interaction between the indexing ring 122 and the multi-height lock ring 82 will now be described. Conventionally, use of an indexing ring 122 (e.g., such as that described in U.S. Pat. No. 6,506,040) has provided a plurality of height adjustments for the movable platen 34. However, in order to accommodate a large range of heights, numerous steps or risers 124 having both short and tall heights are used, which increases the overall size (breadth and height) of the tire curing press 20. Conversely, where the size of the tire curing press 20 is constrained due to limitations of a manufacturing plant, this may in turn limit the overall amount of height adjustments available for the movable platen 34.

In the instant application, use of the multi-height lock ring 82 in combination with the indexing ring 122 can provide a useful benefit to increase, such as double (e.g., for a two-height lock ring), the number of available height adjustments using the indexing ring 122. Generally, a distance between the upper platen 35 and the movable lower platen 34 is adjustable based upon using the movable indexing apparatus to adjust a position of the movable lower platen 34 and using the multi-height lock ring 82 to adjust a position of the upper platen 35. In other words, the multi-height lock ring 82 can provide a rough height adjustment, while the indexing ring 122 is used for a fine height adjustment. For example, as shown in FIG. 6, the annular flange 80A is shown positioned for engagement with the middle leg 98 and first set 94 of notches and teeth of the lock ring 82 to provide a relatively smaller press cavity. The distance $D_1$ between the lower movable platen 34 and the upper platen 35 (carried by the upper cavity part 24) is adjustable and determined by the particular step or riser 124 of the indexing ring 122 chosen to support the lower movable platen 34. By changing the step or riser 124 as described above, the first range of distance $D_1$ varies accordingly to a value between the maximum and minimum heights of the steps or risers 124 of the indexing ring. If the size of the tire to be cured is outside of the first range of distances $D_1$, the upper cavity part 24 can be moved to the position where the annular flange 80B is shown positioned for engagement with the upper leg 100 and second set 96 of notches and teeth of the lock ring 82 to provide a relatively larger press cavity. Now, the distance $D_2$ between the lower movable platen 34 and the upper platen 35 is adjustable and determined by the particular step or riser 124 of the indexing ring 122 chosen to support the lower movable platen 34. Thus, using the same set of steps or risers 124 on the same indexing ring 122, the desired distance $D_1$ or $D_2$ between the lower and upper platens 34, 35 is more highly variable.

As a result, relatively more height adjustments are available while also reducing the overall size (breadth and height) of the tire curing press 20. For example, where conventionally a maximum height step or riser 124 of about 300 mm was used to provide a 300 mm height adjustability, the multi-height lock ring 82 can now substantially reduce this value to a maximum height step or riser 124 of about 150 mm (e.g., reduced by half or other value). This in turn also reduces the overall height of the tire curing press 20 by about 150 mm, which is beneficial for usability and safety. It is understood that a reduction in the maximum height step or riser 124 can correspond generally to the height difference between the middle leg 98 and upper leg 100 of the first and second sets 94, 96, respectively. Further, where the multi-height lock ring 82 utilizes three or more sets, even more height adjustments for the movable platen 34 can be provide for the same indexing ring 122 configuration (which may even further reduce the size of the tire curing press 20).

Additionally, the mold height adjustment mechanism also utilizes a second set of cylinders (i.e., a lift and squeeze assembly) for raising the movable platen 34 and lower mold section relative to the base 26, and also for applying a squeeze force to the movable platen 34. The lift and squeeze assembly comprises of a plurality of lift and squeeze cylinders 130 that are preferably equiangularly spaced about the base 26 (see FIG. 3), such as three lift and squeeze cylinders 130 are positioned at substantially 120-degree angular spacing (although other configurations are contemplated, and more or less cylinders could be used). The lift and squeeze cylinders 130 are mounted on the underside of the base 26 by a plurality of suitable mechanical fasteners. However, the lift and squeeze cylinders 130 can be arranged on the base at a different operational diameter compared to the squeeze cylinders 110. For example, in order to accommodate the indexing ring 122, the lift and squeeze cylinders 130 can be arranged on the base at a relatively smaller operational diameter compared to the squeeze cylinders 110 (or even vice-versa).

The lift and squeeze cylinders 130 have cylinder rods 132 that are secured to the movable platen 34 for raising the movable platen 34 vertically up and down relative to the base 26 to permit the moving of the indexing ring 122. In one example, the cylinder rods 132 are secured to the movable platen 34 by a mechanical fastener 134, such as a bolt or the like. Thus, extension or retraction of the cylinder rods 132 causes direct movement of the movable platen 34. As shown in FIG. 8, the lift and squeeze cylinders 130 have an operative stroke length greater than an operative stroke length of the squeeze cylinders 110 to thereby provide the ability to raise and lower the movable platen 34 vertically up and down to permit the moving of the indexing ring 122. In operation, once the height of the movable platen 34 is chosen, both of the squeeze cylinders 110 and the lift and squeeze cylinders 130 are configured to apply a substantially equal squeeze pressure to the movable platen 34 to thereby establish a uniform final tire curing pressure within the press cavity during a tire curing operation. For example, both of the squeeze cylinders 110 and the lift and squeeze cylinders 130 can be hydraulic cylinders, and a diameter of the squeeze cylinder rod 112 can be substantially equal to a diameter of the lift and squeeze cylinder rod 132 such that substantially equal squeeze pressure can be applied to the movable platen 34 by all of the cylinders.

It can be further desired to guide vertical movement of the movable platen 34 and to maintain alignment of the movable platen 34 relative to the base 26. In one example, a high tolerance bushing 136 can be disposed within a bore 138 that extends through the base 26, with the lift and squeeze cylinder rod 132 received within the bushing 136 to guide vertical movement of the movable platen 34 relative to the base 26. Each of the three lift and squeeze cylinder rods 132 can be received within similar bushings 136, which can be relatively high tolerance bushings to thereby maintain precise axial vertical alignment and movement among the three lift and squeeze cylinders 130. Additionally, a secondary bushing 140 can be disposed within a bore 142 that extends through the movable platen 34 (and/or through a bolster plate disposed underneath and supporting the movable platen 34). The bolt 134 that secures the lift and squeeze cylinder rod 132 to the movable platen 34 can be received within the secondary bushing 140 to maintain a vertical alignment between the bolt 134 and the lift and squeeze cylinder rod 132 during operation. The bushing 140 can be provided directly to the bore 142 of the movable platen 34, or can be provided indirectly via a high-tolerance cap 144 positioned at the top of the lift and squeeze cylinder rod 132 that either forms the secondary bushing 140 or could even itself be received within the secondary bushing 140. A washer can rest upon a shoulder of the movable platen 34, such as within an oversized bore (e.g., greater in size than the bore 142) and be interposed between the head of the bolt 134 and the bushing 140. Thus, the secondary bushing 140 can be clamped between the head of the bolt 134 (with washer) and the cylinder rod 132. The bushing 136 of the base 26 and the secondary bushing 140 of the movable platen 34 can be positioned and arranged so as to have respective longitudinal axes that are substantially coaxial. Thus, the vertical alignment and movement of the lift and squeeze cylinder rods 132 can be tightly controlled to maintain precise axial vertical alignment and movement among the three lift and squeeze cylinders 130. However, the tolerance of the secondary bushing 140 may be intentionally less than the tolerance of the bushing 136 to permit a limited amount of angular movement of the lift and squeeze cylinder rod 132 with respect to the movable lower platen 34 to thereby reduce off-axis force vectors from binding the lift and squeeze cylinder rod 132 when the lift and squeeze cylinders 130 are operated under load. This structure can reduce fatigue load on the lift and squeeze cylinders 130 (and other associated elements) during operation over time. As a result, the movement, angle, and alignment of the movable platen 34 and the lower mold section thereon can be similarly tightly controlled over repeated tire curing operations.

In the normal operation of the tire curing press, the indexing assembly is maintained in one of its positions by the locking assembly. During a changeover in the tire curing press run a different tire size having a different mold height, the cylinder rods 132 of the lift and squeeze cylinders 130 are extended to raise the movable platen 34 to obtain clearance for the press operator to reposition the indexing ring 122. The operator rotates the indexing ring 122 to one of the other positions (e.g., one of the other steps or risers 124) which provides a mold height adjustment that is appropriate for the particular tire molds to be employed for the next production run, and subsequently locks the indexing ring 122. Next, the lift and squeeze cylinders 130 are retracted until the chosen steps or risers 124 rest upon the cylinder rods 112 of the squeeze cylinders 110. This allows the movable platen 34 to be positioned at the new selected height appropriate for the molds to be employed. At this time, the cylinder rods 112 of the squeeze cylinders 110 are at their lowest position resting upon the cylinder housing, and thus the interface between the end of the cylinder rods 112 and the cylinder housing provides a back stop 113 for the movable platen 34. Because the position of the back stop 113 is fixed (e.g., the cylinder housings of the squeeze cylinders 110 are secured to the base 26 and the cylinder rods 112 of the squeeze cylinders 110 are at their lowest position resting upon the cylinder housing), this configuration provides a fixed reference point for setting the position of the lower movable platen 34 relative to the upper platen 35 to thereby achieve tight tolerances within the tire mold. Thereafter, during the actual tire curing operation and with the upper cavity part 24 lowered and locked to the lock ring 82, all of the squeeze cylinders 110 and lift and squeeze cylinders 130 are powered to apply the desired press force to the upper and lower mold sections. It is thus to be appreciated that the press can be readily adapted to run molds having a plurality of different mold height adjustment positions.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A tire curing press, comprising:
   a press cavity for curing vulcanized tires during a tire curing operation at a final tire curing pressure, comprising an upper cavity part and a lower cavity part;
   a base comprising a main body that at least partially forms the lower cavity part;
   a movable platen supported by the base and vertically movable relative to the base, the movable platen configured to support a lower tire mold section that is received within the upper cavity part during the tire curing operation;
   a first cylinder mounted on the base comprising a first cylinder rod;
   a movable indexing apparatus interposed between the first cylinder rod and the movable platen, and comprising a plurality of steps of differing thickness, whereby moving a selected one of the plurality of steps into alignment with the first cylinder rod establishes a different partially open position of the lower mold section; and
   a second cylinder mounted on the base that raises the movable platen relative to the base during an unpressurized changeover operation to permit the moving of the indexing apparatus, and that further applies a squeeze pressure to the movable platen during the tire curing operation, the second cylinder comprising a second cylinder rod secured to the movable platen, the second cylinder having an operative stroke length greater than an operative stroke length of the first cylinder,
   wherein both of the first and second cylinders apply a substantially equal squeeze pressure to the movable platen to thereby establish the final tire curing pressure within the press cavity during said tire curing operation.

2. The tire curing press according to claim 1, further comprising a bushing disposed within a bore that extends through the base, wherein the second cylinder rod is received within the bushing to guide vertical movement of the movable platen.

3. The tire curing press according to claim 2, further comprising a secondary bushing disposed within a bore that extends through the movable platen, wherein the second cylinder rod is secured to the movable platen by a bolt that is received within the secondary bushing to maintain a vertical alignment between the bolt and the second cylinder rod.

4. The tire curing press according to claim 1, wherein the first and second cylinders are hydraulic cylinders, and wherein a diameter of the first cylinder rod is substantially equal to a diameter of the second cylinder rod.

5. The tire curing press according to claim 1, wherein the indexing apparatus is suspended from the movable platen, and is an indexing ring which is rotatably mounted and comprises the plurality of steps that are circumferentially spaced on a bottom surface of the indexing ring.

6. The tire curing press according to claim 1, wherein the first and second cylinders are hydraulic cylinders, and said first and second cylinders receive operational power from a single hydraulic utility service.

7. The tire curing press according to claim 6, wherein a diameter of the first cylinder rod is substantially equal to a diameter of the second cylinder rod.

8. A tire curing press, comprising:
   a press cavity for curing vulcanized tires during a pressurized tire curing operation, and that further undergoes an unpressurized changeover operation, the press cavity comprising an upper cavity part and a lower cavity part;
   a base comprising a main body that at least partially forms the lower cavity part;
   a movable platen supported by the base and vertically movable relative to the base, the movable platen supports a lower tire mold section that is received within the upper cavity part during the pressurized tire curing operation;
   a first cylinder mounted on the base that applies a squeeze pressure during the pressurized tire curing operation, the first cylinder comprising a first cylinder rod;
   a movable indexing apparatus interposed between the first cylinder rod and the movable platen, and comprising a plurality of steps of differing thickness, whereby, during the unpressurized changeover operation, a selected one of the plurality of steps is moved into alignment with the first cylinder rod to thereby establish a different partially open position of the lower tire mold section; and
   a second cylinder mounted on the base that raises the movable platen relative to the base during the unpressurized changeover operation to permit the moving of the indexing apparatus, and that further applies a squeeze pressure to the movable platen during the pressurized tire curing operation, the second cylinder comprising a second cylinder rod secured to the movable platen, wherein the second cylinder has an operative stroke length greater than an operative stroke length of the first cylinder so that the movable platen can be moved vertically up and down to separate the movable platen from the first cylinder to thereby permit the moving of the indexing apparatus during the unpressurized changeover operation.

9. The tire curing press according to claim 8, wherein a diameter of the first cylinder rod is substantially equal to a diameter of the second cylinder rod.

10. The tire curing press according to claim 8, wherein the first and second cylinders are hydraulic cylinders, and said first and second cylinders receive their operational power from a single hydraulic utility service.

11. The tire curing press according to claim 10, wherein both of the first and second cylinders receive operational power from the single hydraulic utility service during the pressurized tire curing operation, and wherein both of the first and second cylinders apply a substantially equal squeeze pressure to the movable platen to thereby establish a final tire curing pressure within the press cavity during said pressurized tire curing operation.

\* \* \* \* \*